United States Patent
Ukai et al.

(10) Patent No.: US 8,291,547 B2
(45) Date of Patent: Oct. 23, 2012

(54) CUSHION CLIP

(75) Inventors: Junya Ukai, Okazaki (JP); Toshio Iwahara, Okazaki (JP); Reiko Yamamoto, Anjo (JP); Minoru Takemoto, Yatomi (JP)

(73) Assignee: Daiwa Kasei Kogyo Kabushiki Kaisha, Aichi-ken (JP)

( * ) Notice: Subject to any disclaimer, the term of this patent is extended or adjusted under 35 U.S.C. 154(b) by 154 days.

(21) Appl. No.: 12/845,205

(22) Filed: Jul. 28, 2010

(65) Prior Publication Data

US 2011/0030177 A1 Feb. 10, 2011

(30) Foreign Application Priority Data

Jul. 28, 2009 (JP) ................................ 2009-175175

(51) Int. Cl.
*E05F 5/00* (2006.01)

(52) U.S. Cl. ...................... 16/86 R; 296/1.03; 267/141

(58) Field of Classification Search ................ 16/82, 85, 16/86 R, 86 A, 86 B, DIG. 21; 296/37.12, 296/1.03, 207; 24/458, 570, 591.1; 293/104, 293/132, 136; 267/136, 141
See application file for complete search history.

(56) References Cited

U.S. PATENT DOCUMENTS

| | | | | |
|---|---|---|---|---|
| 2,813,712 A | * | 11/1957 | Stanis | 267/257 |
| 4,218,599 A | * | 8/1980 | Garn | 200/530 |
| 5,735,511 A | * | 4/1998 | Stocker et al. | 267/140.13 |
| 6,857,166 B2 | * | 2/2005 | Nakagaki et al. | 16/86 R |
| 7,168,130 B2 | * | 1/2007 | Shin | 16/82 |
| 7,469,445 B2 | * | 12/2008 | Dennis et al. | 16/86 R |
| 7,566,081 B2 | * | 7/2009 | Aoyama | 296/1.03 |
| 2005/0145767 A1 | * | 7/2005 | Nakagaki et al. | 248/345.1 |
| 2010/0192335 A1 | * | 8/2010 | Ukai et al. | 24/591.1 |
| 2011/0167590 A1 | * | 7/2011 | Ukai et al. | 16/85 |

FOREIGN PATENT DOCUMENTS

| | | |
|---|---|---|
| JP | 2006-153083 | 6/2006 |
| JP | 2007-225093 | 9/2007 |
| JP | 2008094261 A * | 4/2008 |

* cited by examiner

*Primary Examiner* — William L. Miller
(74) *Attorney, Agent, or Firm* — Patterson Thuente Christensen Pedersen, P.A.

(57) ABSTRACT

A cushion clip includes a hollow cushioning portion, an engagement portion and a projection. The cushioning portion has a bottom wall portion and a side wall portion, and the side wall portion has cone-shaped outer and inner surfaces that are tapered from a proximal end toward a distal end thereof. The side wall portion has a top portion that is formed in the distal end thereof, and the top portion has an inner periphery radially inwardly protruding from the side wall portion and defining the central opening therein. The projection is cylindrically projected from the bottom wall portion toward the central opening of the cushioning portion, and has an upper end portion which diameter is larger than or equal to a diameter of the opening.

9 Claims, 10 Drawing Sheets

CUSHION CLIP

This application claims priority to Japanese patent application serial number 2009-175175, filed on Jul. 28, 2009.

BACKGROUND OF THE INVENTION

1. Field of the Invention

The present invention relates to a cushion clip. More particularly, the present invention relates to a cushion clip that is attached to an attachment hole formed in a stationary member while the cushion clip is positioned between the stationary member and a movable member so as to absorb an impact that can be produced when the movable member moves toward the stationary member.

2. Description of Related Art

This type of cushion clip is already known. Generally, in such a cushion clip, a cushioning portion that is capable of absorbing an impact is integrated with an engagement portion that is capable of engaging with an attachment hole formed in a stationary member. Further, in the cushion clip thus constructed, the cushioning portion is formed of a soft resin material and has a hollow and substantially cylindrical shape. When a movable member moves toward a stationary member, the cushioning portion of the cushion clip is elastically deformed and compressed between the stationary member and the movable member. As a result, the impact can be absorbed. Thus, the cushion clip is capable of providing an impact absorbing function.

The cushion clip may preferably be used to absorb an impact that can be generated when a door (cover) of a glove box of a vehicle is closed. The cushion clip used in the glove box may provide following functions in addition to the impact absorbing function.

(1) The cushion clip can prevent the door of the glove box from vibrating while the vehicle is moving.

(2) The cushion clip can prevent the door from directly contacting the glove box even when the door is strongly pushed by hand or elbow of a passenger or the like, so as to prevent noise generation and damage of the door and/or the glove box.

(3) The cushion clip can absorb a dimensional error of the door so as to prevent rattling of the door resulting from its inaccurate positioning due to the dimensional error of the door.

(4) The cushion clip can have a good appearance in size and shape when the door is opened.

Therefore, the cushion clip used in the glove box should include the following characteristics in order to provide the functions described above.

(a) When the door is closed, the cushion clip can be appropriately compressed so as to generate a reaction force that is capable of preventing the glove box from vibrating.

(b) The cushion clip can generate a large reaction force when a large load is applied thereto.

(c) In order to generate a desired (required) reaction force regardless of magnitude of the dimensional error of the door, the cushion clip can generate a substantially constant reaction force over a wide range of amount of compression.

(d) The cushion clip is small and does not have an irregular shape.

One drawback of not having the characteristics described above include, for example, that the door of the glove box cannot be sufficiently prevented from vibrating. This may lead to noise generation. Further, the door cannot be smoothly closed.

Thus, the cushion clip used in the glove box should include the following characteristics with regard to a relation between the reaction force and the amount of compression.

(i) In an initial compression period of the cushion clip, as the amount of compression is increased, the reaction force can be quickly increased such that the desired reaction force can be quickly obtained.

(ii) In a middle compression period of the cushion clip, which corresponds to a period after the reaction force reaches a lower limit of the desired reaction force, as the amount of compression is increased, the reaction force can be slowly or gently increased.

(iii) In a terminal compression period of the cushion clip, which corresponds to a period after the reaction force reaches an upper limit of the desired reaction force (after the amount of compression reaches a desired amount of compression), as the amount of compression is increased, the reaction force can be quickly increased.

Further, a relation between the reaction force and the amount of compression in an ideal cushion clip is shown in FIG. 13 as an ideal reaction force line. As will become apparent from FIG. 13, the ideal reaction force line may preferably include an initial compression range (a range A-B), a middle compression range (a range B-E) and a terminal compression range (a range E-).

A reaction force at a point B in the ideal reaction force line corresponds to the lower limit of the desired reaction force (which will be referred to as a minimum reaction force). When the cushion clip is compressed until the minimum reaction force can be generated, the cushion clip is capable of effectively preventing the door of the glove box from vibrating and generating noise while the vehicle is moving. Further, a reaction force at a point E in the ideal reaction force line corresponds to the upper limit of the desired reaction force (which will be referred to as a maximum reaction force). When the cushion clip is compressed until the maximum reaction force can be generated, a lock device of the door cannot be easily unlocked. Further, when the cushion clip is further compressed until a reaction force greater than the maximum reaction force is generated, the lock device of the door is subjected to an excessive load. This may lead to malfunction of the lock device.

Thus, the desired reaction force substantially corresponds to a reaction force between the minimum reaction force and the maximum reaction force. As will be appreciated from FIG. 13, the middle compression range (the range B-E) of the ideal reaction force line is very wide. That is, in the ideal cushion clip, a range R of the amount of compression in which the desired reaction force can be generated is very wide. This means that the ideal cushion clip can generate the desired reaction force over a wide range of the amount of compression. Further, the range R of the amount of compression may be referred to as an effective stroke of the ideal cushion clip.

A known cushion clip is taught, for example, by Japanese Laid-Open Patent Publication No. 2006-153083. The cushion clip includes a hollow cushioning portion. The cushioning portion has a protrusion that is formed in a bottom wall portion thereof.

Further, another known cushion clip is taught, for example, by Japanese Laid-Open Patent Publication No. 2007-225093. The cushion clip includes a cushioning portion having an accordion side wall. The cushioning portion has a protrusion that is formed in a bottom wall portion thereof.

A cushion clip is shown in FIG. 14, which cushion clip has the substantially same construction as the cushion clip taught by Japanese Laid-Open Patent Publication No. 2006-153083.

The cushion clip 101 includes a cushioning portion 110 that is capable of absorbing an impact, and an engagement portion 120 that is capable of attaching the cushioning portion 110 to a stationary member. The cushioning portion 110 is made of a soft material having elasticity. Conversely, the engagement portion 120 is made of a hard material having a predetermined rigidity. Further, the cushioning portion 110 has a side wall portion 112 having a cone-shaped outer surface 170 and a vertically extending cylindrical inner surface 180. In addition, the cushioning portion 110 has a cavity portion 140 that is defined by the inner surface 180 of the side wall portion 112. The cushioning portion 110 has a substantially circular opening 160 that is defined by an upper end periphery 112a of the side wall portion 112. Further, the cushioning portion 110 has a bottom wall portion 113 that is integrated with the side wall portion 112. The bottom wall portion 113 has a projection 190 that is upwardly projected from the bottom wall portion 113 toward the circular opening 160.

In the cushion clip 101, the side wall portion 112 can be deformed due to compressive performance thereof, so as to generate a reaction force. Therefore, when a load applied to the cushion clip 101 is changed, the reaction force generated by the deformed side wall portion 112 can be changed in a quadratic curve. As a result, a range of amount of compression in which desired reaction force can be generated is very narrow. Therefore, the cushion clip 101 cannot generate the desired reaction force over a wide range of the amount of compression. That is, an effective stroke of the cushion clip 101 is very short.

In addition, the conventional product of the cushion clip 101, shown in FIG. 14, has the projection 190 provided for the gate. Thus, the range of the stroke is small and the reaction force becomes large before the door is closed. Further, because a diameter of the projection 190 is thin, the projection 190 cannot work well as a stopper and cannot prevent interference between the door and the glove box.

Therefore, there is a need in the art for further improved cushion clips.

SUMMARY OF THE INVENTION

A cushion clip capable of being attached to an attachment hole formed in a stationary member so as to be positioned between the stationary member and a movable member for absorbing an impact that may be applied when the movable member moves toward the stationary member. The cushion clip may include an engagement portion, a cushioning portion and a projection so that the cushion clip is capable of engaging the engagement portion with the attachment hole and the cushioning portion absorbs the impact. The cushioning portion has a bottom wall portion and a side wall portion. The side wall portion has cone-shaped outer and inner surfaces each linearly tapered in a direction from a proximal end toward a distal end of the side wall portion. The side wall portion further has a top portion disposed at the distal end thereof. The top portion has an inner periphery radially inwardly protruding from the side wall portion and defining a central opening therein. The projection projects from the bottom wall portion in a manner like a column toward the central opening of the cushioning portion. The projection has an upper end portion having a diameter larger than or equal to a diameter of the central opening. As the movable member moves toward the stationary member, the top portion of the side wall portion is pushed by the movable member and covers the upper end portion of the projection.

According to one example, in an initial compression period of the cushioning portion, the side wall portion of the cushioning portion can be deformed in a compression direction. Therefore, in the initial compression period, a reaction force generated by the deformed side wall portion can be increased quickly. Conversely, in a middle compression period of the cushioning portion, the side wall portion of the cushioning portion can be deformed outwardly without being substantially deformed in the compression direction. Then, a lower portion of the top portion of the side wall portion is deformed downward so as to cover the upper end portion of the cylindrical projection projected from the bottom wall portion of the cushioning portion. Therefore, in the middle compression period, the reaction force generated by the deformed side wall portion can be gently changed. In addition, the side wall portion can be smoothly and constantly deformed until the top portion of the side wall portion contacts the projection projected from the bottom wall portion of the cushioning portion. Therefore, the cushioning portion can constantly generate a desired reaction force over a very wide range of amount of compression. After the top portion of the side wall portion contacts the projection, the compression resistance is increased quickly because the reaction force from the projection is added. Therefore, by changing the height of the projection, an effective stroke of the cushion clip can be adjusted. Further, the side wall portion is capable of absorbing the impact so as to cushion the impact when the movable member contacts the side wall portion and the side wall portion contacts the projection. Therefore, it is not necessary to enlarge the size of the cushion clip, and the cushion clip can be deformed without being substantially bent over to provide a necessary repulsion force. After reaching a desired stroke, the reaction force may be increased quickly.

The cushion clip may be constructed such that the attachment hole is provided in a recessed portion of the stationary member. The top portion of the side wall portion and the projection have such sizes and strengths to prevent the movable member from interfering with the stationary member. Therefore, the top portion of the side wall portion and the projection of the cushion clip that is attached to the attachment hole provided in the recessed portion of the stationary member have certain dimension and strengths to prevent the movable member from interfering with the stationary member.

Here, the dimension that can prevent the interference means that a thickness of the top portion and a height of the projection have a certain dimensions respectively such that the top portion of the side wall portion and the projection are held between the movable member and the stationary member before the movable member contacts the stationary member. The strengths that can prevent the interference means to prevent the movable member from interfering with the stationary member by the reaction force generated by the compression in the top portion and the projection. Therefore, the interference between the movable member and the stationary member providing the attachment hole in the recessed portion thereof can be prevented.

The cushion clip may be constructed such that the side wall portion has a thickness that is reduced in a direction from the proximal end toward the distal end thereof. Because the side wall portion has the thickness that is reduced in a direction from the proximal end toward the distal end thereof, as the load is applied to the door, the side wall portion can be smoothly and constantly flexed due to flexural performance thereof while the flexure portion is gradually moved downwards. Therefore, it is not necessary to enlarge the size of the cushion clip, and the cushion clip can be deformed without being substantially bent over to provide a necessary repulsion force.

The cushion clip may be constructed such that the cushioning portion is formed of soft material and the engagement portion is formed of hard resin material. Therefore, the cushioning portion formed of soft resin material is suitable for absorbing the impact, and the engagement portion formed of hard resin material is engaged with the attachment hole stably.

The cushion clip may be constructed such that the projection is formed of soft material and is integrally molded with the cushioning portion. Therefore, it is easy to form the projection because the projection is integrally molded with the cushioning portion. Further, the projection is formed of soft material, thus it is hardly damaged even if the side wall portion contacts the projection, and a sound that may be produced by the interference between them is low and is not uncomfortable.

The cushion clip may be constructed such that the projection is formed of hard resin material and is integrally molded with the engagement portion. Therefore, it is easy to form the projection because the projection is integrally molded with the engagement portion. Further, the projection is formed of hard resin material, thus it is capable of increasing the reacting force quickly after the side wall portion contacts the projection.

The cushion clip may be constructed such that an inner protrusion is formed of hard resin material and is integrally molded with the engagement portion, and an outer protrusion is formed of soft material and integrally molded with the cushioning portion, and the inner protrusion is covered with the outer protrusion. Because the inner protrusion formed of hard resin material is covered with soft material, the side wall portion formed of soft material may not contact directly the outer protrusion formed of hard resin material. Thus, it is hardly damaged even if the side wall portion contacts the projection, and a sound that may be produced by the interference between them is low and is not uncomfortable.

Other objects, features and advantages of the present invention will be readily understood after reading the following detailed description together with the accompanying drawings and the claims.

DETAILED DESCRIPTION OF THE INVENTION

Figure 1:
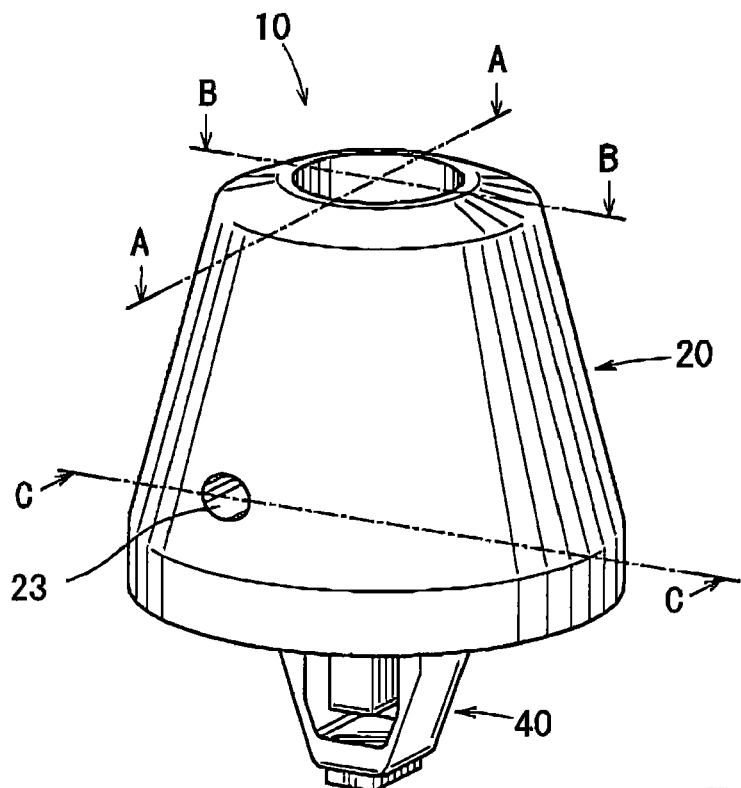
FIG. 1 is an external perspective view of a cushion clip according to a representative example of the present invention.

Examples will be described with reference FIGS. 1 to 13 and 15-20.

U.S. application Ser. No. 12/686,515 filed on Jan. 13, 2010 and assigned to the same assignee as the present application discloses a cushion clip 210 shown in FIG. 17, and its contents are herein entirely incorporated by reference. The cushion clip 210 may preferably be positioned between a box main body 250 of a glove box of a vehicle and a cover or door 254 of the glove box while the cushion clip 210 is secured to the box main body 250, so as to absorb an impact that can be produced when the door 254 is closed. The cushion clip 210 is composed of a cushioning portion 220 that is capable of absorbing the impact, and an engagement portion 240 that is capable of engaging with an attachment hole 252 formed in the box main body 250. The cushioning portion 220 and the engagement portion 240 may preferably be integrated with each other.

Figure 16:
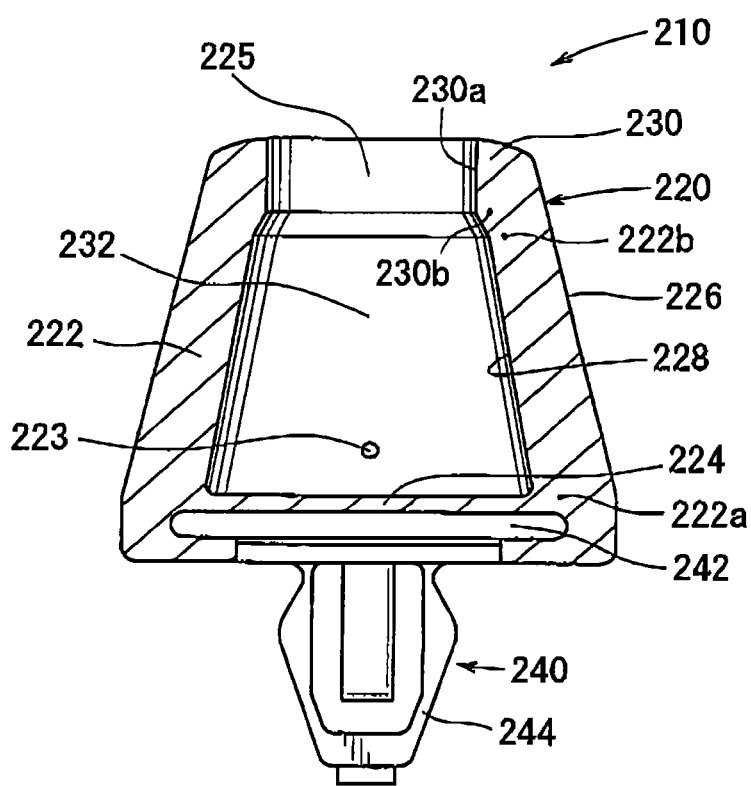
FIG. 16 is a vertical sectional view of a cushion clip of the related invention.

As shown in FIG. 16, the cushioning portion 220 of the cushion clip 210 is formed as an integrally formed hollow member that is composed of a bottom wall portion 224 and a side wall portion 222. The side wall portion 222 has a cone-shaped outer surface 226 that is linearly tapered upwardly (i.e., from a proximal end 222a of the side wall portion 222 toward a distal end 222b of the side wall portion 222), and a cone-shaped inner surface 228 that is linearly tapered upwardly (i.e., from the proximal end 222a of the side wall portion 222 toward the distal end 222b of the side wall portion 222). Further, the outer and inner surfaces 226 and 228 may preferably be tapered upwardly such that the side wall portion 222 has a thickness that is reduced from the proximal end 222a thereof toward the distal end 222b thereof. Further, the cushioning portion 220 has a cavity portion 232 that is defined by the inner surface 228 of the side wall portion 222. In addition, the cushioning portion 220 has a substantially circular central opening 225 formed in an upper or top portion 230 that is formed in the distal end 222b of the side wall portion 222. The opening 225 is defined by an inner periphery 230a of the top portion 230 and is continuous with the cavity portion 232.

Further, as will be apparent from FIG. 16, the inner periphery 230a of the top portion 230 is radially inwardly projected. That is, the top portion 230 is thicker than the side wall portion 222. Therefore, a lower end 230b of the top portion 230 has a thickness greater than the thickness of the distal end 222b of the side wall portion 222. As a result, the opening 225 that is defined by the inner periphery 230a of the top portion 230 has a diameter smaller than the inner diameter of the distal end 222b of the side wall portion 222.

Figure 15:
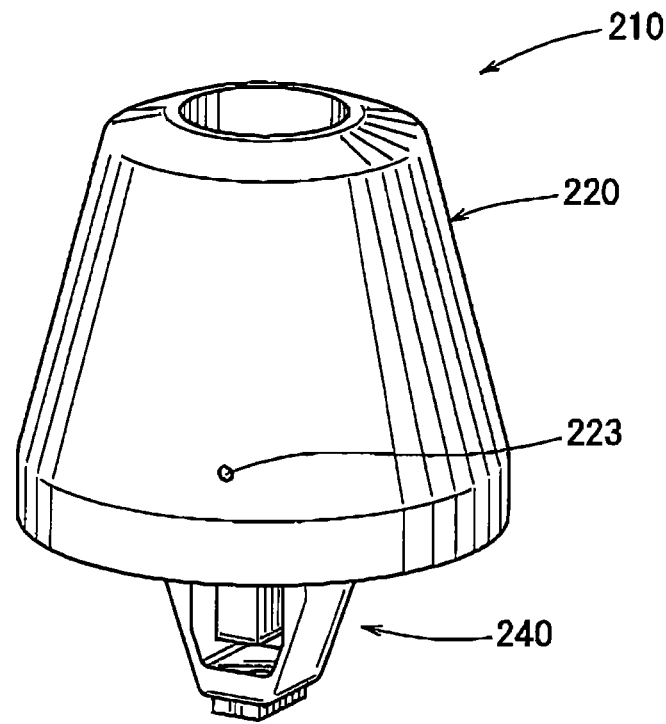
FIG. 15 is an external perspective view of a cushion clip of the related invention.

As shown in FIGS. 15 and 16, the side wall portion 222 has one or more (two in this example) vent holes 223 passing therethrough. The vent holes 223 are respectively formed so as to be positioned closer to the bottom wall portion 224. Further, the vent holes 223 are arranged and constructed so as not to affect the deformation characteristics of the cushioning portion 220.

As shown in FIG. 16, the engagement portion 240 of the cushion clip 210 is composed of a disc-shaped base portion 242 that is embedded in the bottom wall portion 224 of the cushioning portion 220, and an engagement leg 244 that is projected downwards. The engagement leg 244 is shaped to be inserted into the attachment hole 252 formed in the box main body 250 (FIG. 17).

The cushioning portion 220 is formed of elastomer. Conversely, the engagement portion 240 is formed of polypropylene. That is, the cushioning portion 220 and the engagement portion 240 are integrally formed by two-color molding of elastomer and polypropylene.

Next, an operation of the cushion clip 210 thus constructed will now be described in detail.

Figure 17:
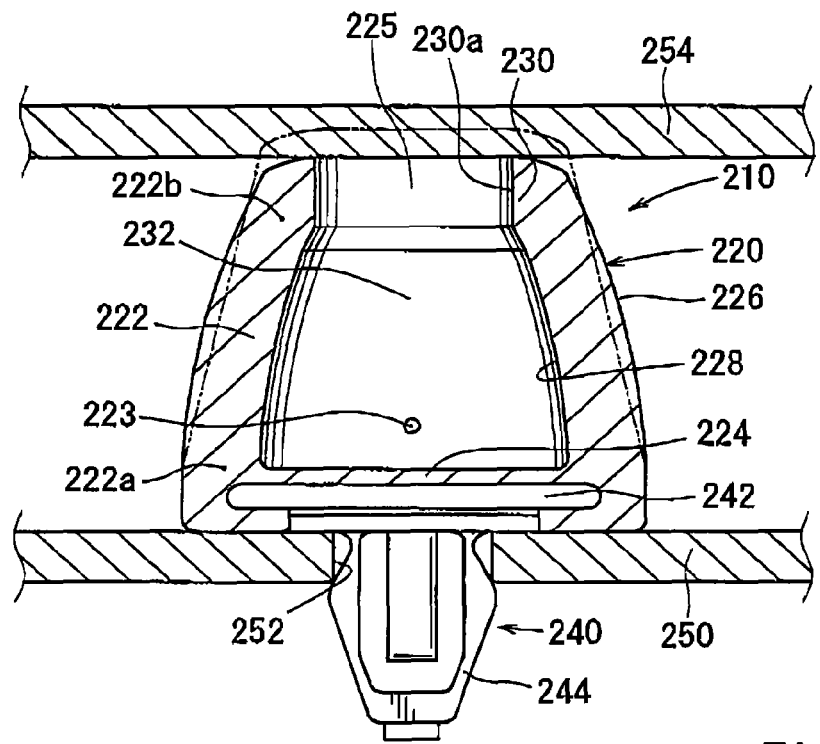
FIG. 17 is a vertical sectional view of a cushion clip of the related invention, which view illustrates a condition in which the cushion clip is in an initial compression period.

First, as shown by broken lines in FIG. 17, the cushion clip 210 is attached to the box main body 250 by inserting the engagement let 244 into the attachment hole 252 of the box main body 250.

Thereafter, a load is applied to the door 254, that the door 254 starts to move toward the box main body 250. When the door 254 contacts the cushioning portion 220 of the cushion clip 210, the door 254 starts to compress the cushioning portion 220. At an initial stage of compression immediately after starting compression of the cushioning portion 220, as shown by solid lines in FIG. 17, the side wall portion 222 can be deformed in a compression direction while the outer and inner surfaces 226 and 228 are arcuately curved outwardly. In this condition, a reaction force generated by the compressed cushioning portion 220 (the deformed side wall portion 222) can be quickly increased in proportion to an amount of compression of the compressed cushioning portion 220.

Figure 13:
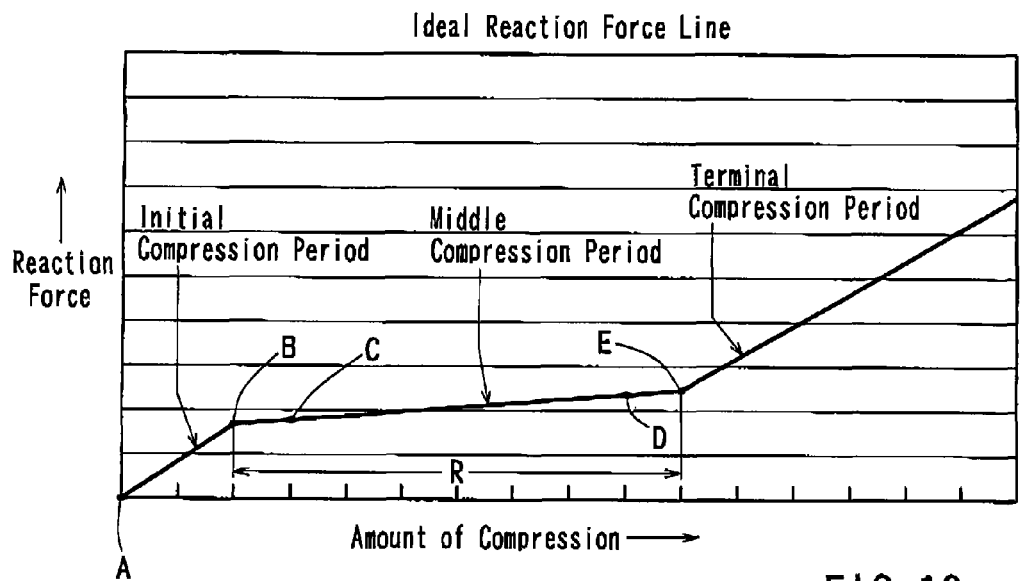
FIG. 13 is a graph illustrating an ideal reaction force line of an ideal cushion clip.
Figure 14:
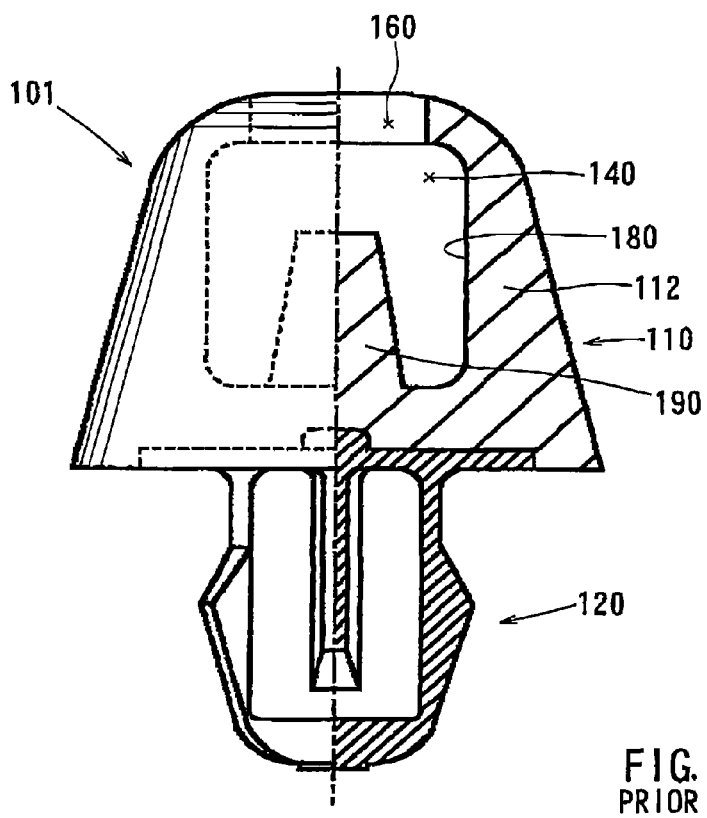
FIG. 14 is a partially sectional elevational view of a conventional cushion clip.

This period will be referred to as an initial compression period of the cushioning portion 220, which corresponds to the initial compression range (the range A-B) of the ideal reaction force line shown in FIG. 13.

Figure 18:
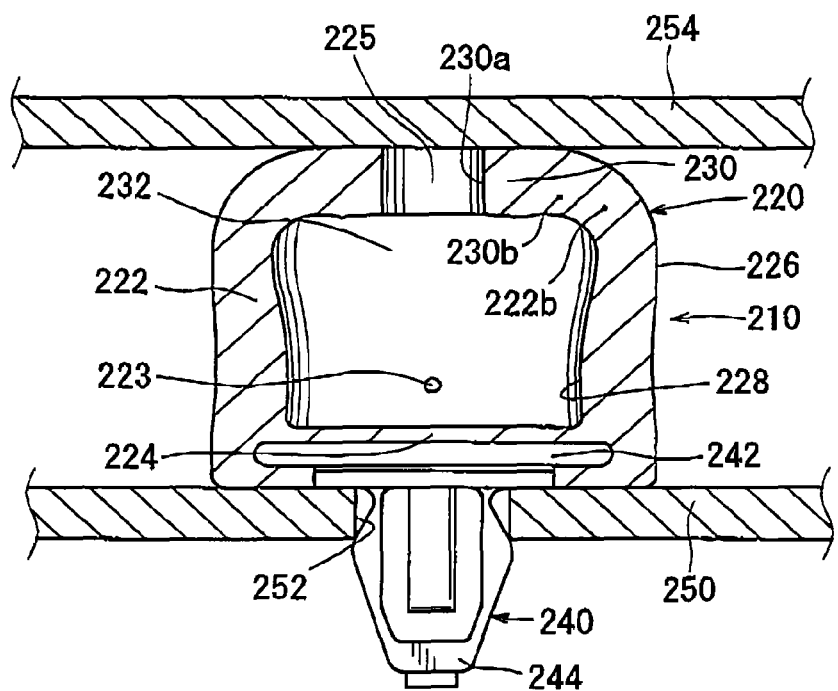
FIG. 18 is a vertical sectional view of a cushion clip of the related invention, which view illustrates a condition in which the cushion clip is in an initial stage of a middle compression period.

As shown in FIG. 18, after the initial compression period of the cushioning portion 220 is completed, the side wall portion 222 of the cushioning portion 220 can be deformed to have a cylindrical shape. In this condition, the reaction force generated by the compressed cushioning portion 220 can be gently increased.

This condition is referred to as an initial stage of a middle compression period of the cushioning portion 220, which corresponds to an initial range (a range B-C) in the middle compression range (the range B-E) of the ideal reaction force line shown in FIG. 13.

As previously described, in the cushion clip 210, the outer and inner surfaces 226 and 228 are tapered upwardly such that the thickness of the side wall portion 222 of the cushioning portion 220 is reduced upwardly. Further, the lower end 230b of the top portion 230 has a thickness greater than the thickness of the distal end 222b of the side wall portion 222. That is, the cushioning portion 220 is constructed such that the upper portion of the side wall portion 222 can be deformed most easily. Therefore, in the initial stage of the middle compression period of the cushioning portion 220, the distal end 222b of the side wall portion 222, that is continuous with the lower end 230b of the top portion 230, is arcuately flexed in vertical cross section while the top portion 230 of the side wall portion 222 being depressed inwardly downwardly. In contrast, the remaining portion or a substantial portion of the side wall portion 222 can simply be deformed outwardly without being deformed in the compression direction. Thus, the substantial portion of the side wall portion 222 can be deformed cylindrically so as to extend in parallel with the compression direction.

Figure 19:
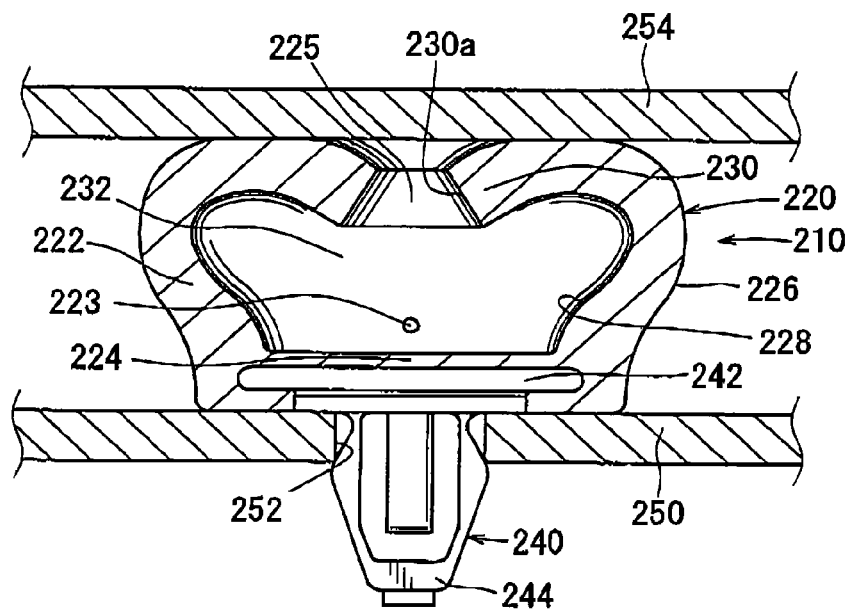
FIG. 19 is a vertical sectional view of a cushion clip of the related invention, which view illustrates a condition in which the cushion clip is in a stable stage of the middle compression period.
Figure 20:
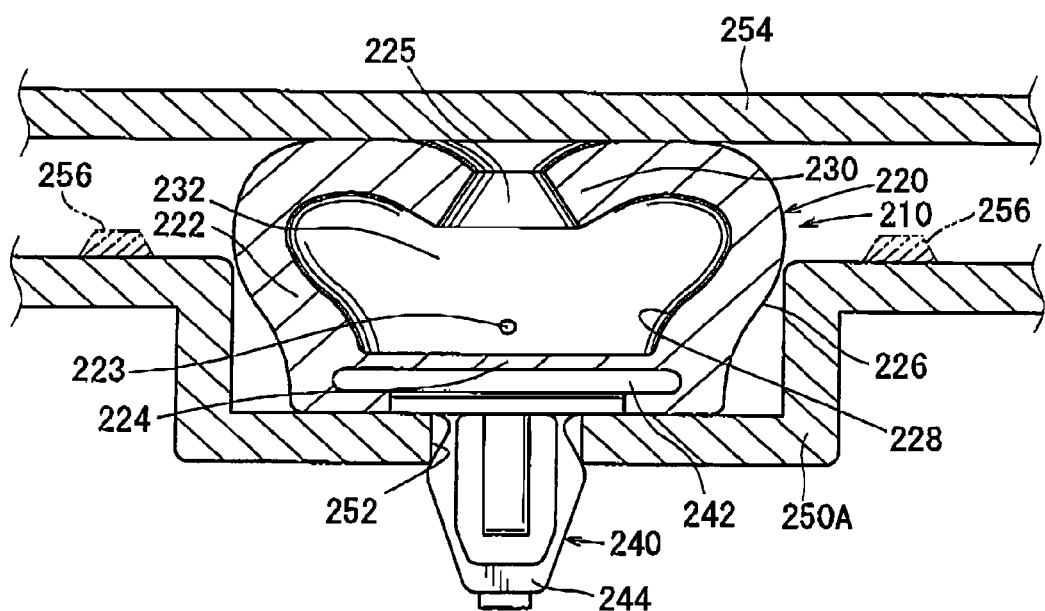
FIG. 20 is a vertical sectional view of a cushion clip of the related invention, which view illustrates a condition in which the cushion clip is attached to the recessed portion of the stationary member.

As shown in FIG. 19, when the cushioning portion 220 is further compressed, the substantial portion of the side wall portion 222 of the cushioning portion 220 can be deformed outwardly while it is deformed in the compression direction. In this condition, the reaction force generated by the compressed cushioning portion 220 can be gently increased.

This condition is referred to as an intermediate stage of the middle compression period of the cushioning portion 220, which corresponds to an intermediate range (a range C-D) in the middle compression range (the range B-E) of the ideal reaction force line shown in FIG. 13.

In the intermediate stage of the middle compression period of the cushioning portion 220, the cylindrically shaped side wall portion 222 of the cushioning portion 220 can be flexed at a flexure portion while it is arcuately deformed outwardly. As will be recognized, because the side wall portion 222 has the thickness that is reduced from the proximal end 222a thereof toward the distal end 222b thereof, as the load applied to the door 254 is changed, the side wall portion 222 can be smoothly and constantly flexed due to flexural performance thereof while the flexure portion is gradually moved downwards. Therefore, even when the load applied to the door 254 is changed (increased), the reaction force generated by the deformed side wall portion 222 can be gently changed (increased) while the amount of compression of the cushioning portion 220 can be increased. Thus, in this stage, a desired reaction force can be generated. Further, because no obstacle (e.g., projection) is positioned in the cavity portion 232 of the cushioning portion 220, the side wall portion 222 can be smoothly and constantly flexed until the top portion 230 of the side wall portion 222 contacts the bottom wall portion 224 of the cushioning portion 220.

According to the cushion clip 210, in the intermediate stage of the middle compression period of the cushioning portion 220, which corresponds to the intermediate range (the range C-D) in the middle compression range (the range B-E) of the ideal reaction force line, the side wall portion 222 can be smoothly and constantly flexed until the top portion 230 of the side wall portion 222 contacts the bottom wall portion 224 of the cushioning portion 220. Therefore, the intermediate stage of the middle compression period of the cushioning portion 220 is very wide. Thus, the cushioning portion 220 can generate the desired reaction force over a very wide range of amount of compression thereof. That is, an effective stroke of the cushion clip 210 is very long. In addition, in this stage, it is not necessary to enlarge the cushion clip 210, and the cushion clip 210 can be deformed without being substantially bent over.

Figure 5:
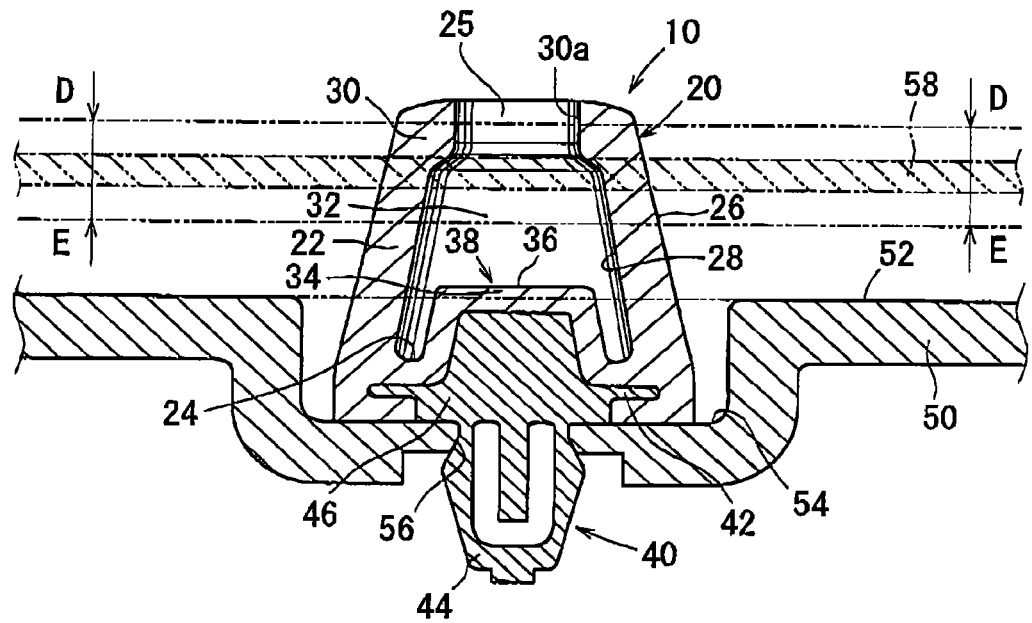
FIG. 5 is a vertical sectional view showing an engaging condition of the cushion clip of one example.

As shown in, for example, FIG. 5, a representative cushion clip 10 may preferably be positioned between a box main body 50 (serving as a stationary member) and a cover or a door 58 (serving as a movable member) of a glove box of an vehicle while the cushion clip 10 is secured to the box main body 50 so as to absorb an impact that may be produced when the door 58 is closed. As shown in FIGS. 1 to 4, the cushion clip 10 is composed of a cushioning portion 20 that is capable of absorbing the impact, an engagement portion 40 that is capable of engaging with an attachment hole 56 formed in the box main body 50, and a projection 38 composed of an outer protrusion 34 and an inner protrusion 46, which are capable of preventing the door 58 from contacting the box main body 50. The cushioning portion 20 and the outer protrusion 34 are integrally formed of elastomer, and the engagement portion 40 and the inner protrusion 46 are integrally formed of polypropylene. The cushioning portion 20 with the outer protrusion 34 and the engagement portion 40 with the inner protrusion 46 may preferably be integrally formed by two-color molding process.

Figure 2:
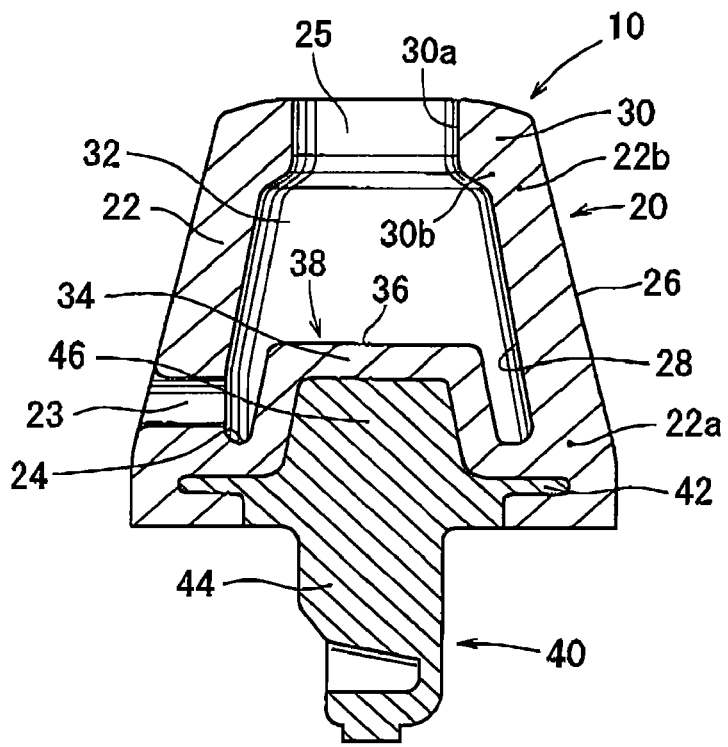
FIG. 2 is a vertical sectional view taken along a dashed line A-A of FIG. 1.
Figure 3:
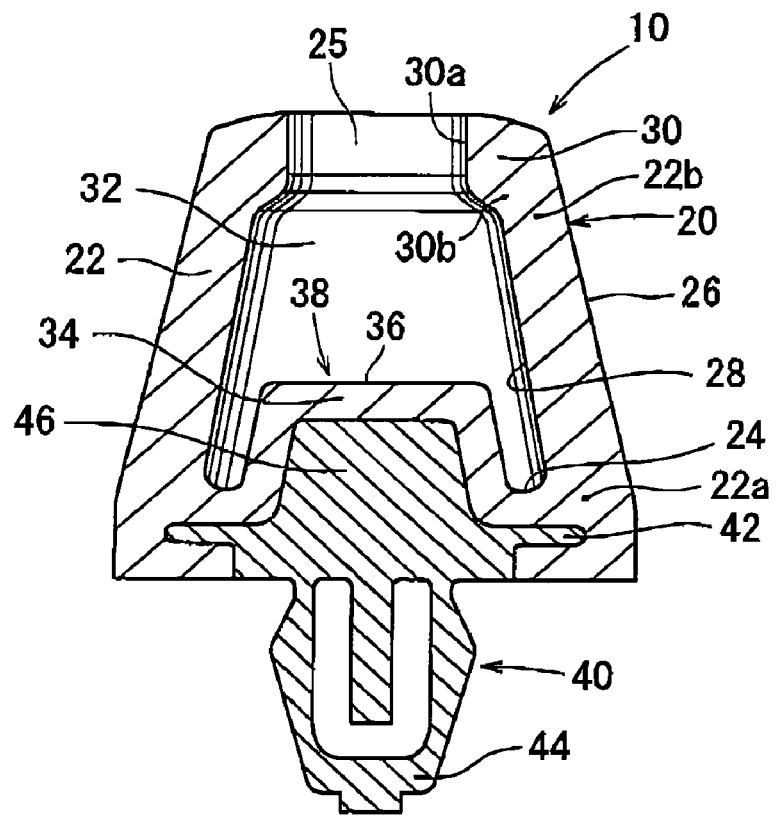
FIG. 3 is a vertical sectional view taken along a dashed line B-B of FIG. 1.
Figure 4:
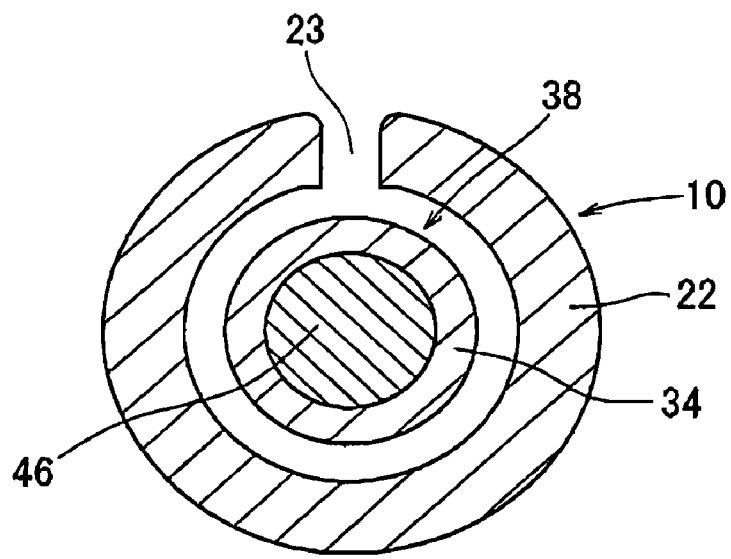
FIG. 4 is a horizontal sectional view taken along a dashed line C-C of FIG. 1.

As shown in FIGS. 2 and 3, the cushioning portion 20 of cushion clip 10 is formed as an integrally formed hollow member that is composed of a bottom wall portion 24 and a side wall portion 22. The side wall portion 22 has a cone-shaped outer surface 26 that is linearly tapered upwardly (i.e., from a proximal end 22a of the side wall portion 22 toward a distal end 22b of the side wall portion 22), and a cone-shaped inner surface 28 that is linearly tapered upwardly (i.e., from the proximal end 22a of the side wall portion 22 toward the distal end 22b of the side wall portion 22). Further, the outer and inner surfaces 26 and 28 may preferably be tapered upwardly such that the side wall portion 22 has a thickness that is reduced from the proximal end 22a thereof toward the distal end 22b thereof. Further, the cushioning portion 20 has a cavity portion 32 that is defined by the inner surface 28 of the side wall portion 22. In addition, the cushioning portion 20 has a substantially circular central opening 25 formed in an upper or top portion 30 that is formed in the upper end of the side wall portion 22. The opening 25 is defined by an inner periphery 30a of the top portion 30 and is continuous with the cavity portion 32.

Further, as will be apparent from FIGS. 2 and 3, the inner periphery 30a of the top portion 30 is radially inwardly projected. That is, the top portion 30 is thicker than the side wall portion 22. Therefore, a lower end 30b of the top portion 30 has a thickness greater than the thickness of the distal end 22b of the side wall portion 22. As a result, the opening 25 that is defined by the inner periphery 30a of the top portion 30 has a diameter smaller than the inner diameter of the distal end 22b of the side wall portion 22.

As shown in FIGS. 1 and 2, the side wall portion 22 of the cushioning portion 20 has a vent hole 23 passing therethrough. The vent hole 23 is formed so as to be positioned closer to the bottom wall portion 24. Further, the vent hole 23 is arranged and constructed so as not to affect the deformation characteristics of the cushioning portion 20.

The projection 38 is cylindrically projected from the bottom wall portion 24 of the cushioning portion 20 toward the upper opening 25. This outer protrusion 34 covers the inner protrusion 46 which is integrated with the engagement portion 40 and is formed as a cone-shaped frustum. Because the outer protrusion 34 covers the inner protrusion 46 formed of polypropylene that is a hard resin material, it has a characteristic of being hardly bent by the load and capable of generating a large reaction force.

As shown in FIGS. 2 and 3, the engagement portion 40 of the cushion clip 10 is composed of a disc-shaped base portion 42 that is embedded in the bottom wall portion 24 of the cushioning portion 20, the inner protrusion 46 projecting upwardly from the bottom wall portion 24 of the cushioning portion 20, and an engagement leg 44 that is projected downwards from the cushioning portion 20. The engagement leg 44 is shaped to be inserted into the attachment hole 56 formed in the box main body 50 (FIG. 5).

FIG. 5 shows a vertical sectional view of the cushion clip 10 that is attached to the attachment hole 56 provided in the recessed portion 54 of the box main body 50. A line D-D corresponds to an amount of deformation generating a minimum reaction force as explained in the ideal reaction force line, and an line E-E corresponds to the amount of deformation generating the maximum reaction force as explained in the ideal reaction force line. A distance between the line D-D and the line E-E is the stroke of the cushion clip 10. The cushion clip 10 can be used for the door 58 that is configured to close between the line D-D and the line E-E.

As shown in FIG. 5, in the condition that the cushion clip 10 is attached to the attachment hole 56 provided in the recessed portion 54 of the box main body 50, the upper end portion 36 of the projection 38 of the cushion clip 10 is positioned higher than a surface 52 of the box main body 50.

Here, the deformation of the cushioning portion 20 of the cushion clip 10 when the door 58 is closed will be explained. Thereafter, a load is applied to the door 58, the door 58 starts to move toward the box main body 50. When the door 58 contacts the cushioning portion 20 of the cushion clip 10, the door 58 starts to compress the cushioning portion 20. At an initial stage of compression immediately after starting compression of the cushioning portion 20, as shown in FIG. 5, the side wall portion 22 can be deformed in a compression direction while the outer and inner surfaces 26 and 28 are arcuately curved outwardly. In this condition, a reaction force generated by the compressed cushioning portion 20 (the deformed side wall portion 22) can be quickly increased in proportion to an amount of compression of the compressed cushioning portion 20. This period will be referred to as an initial compression period of the cushioning portion 20.

Figure 6:
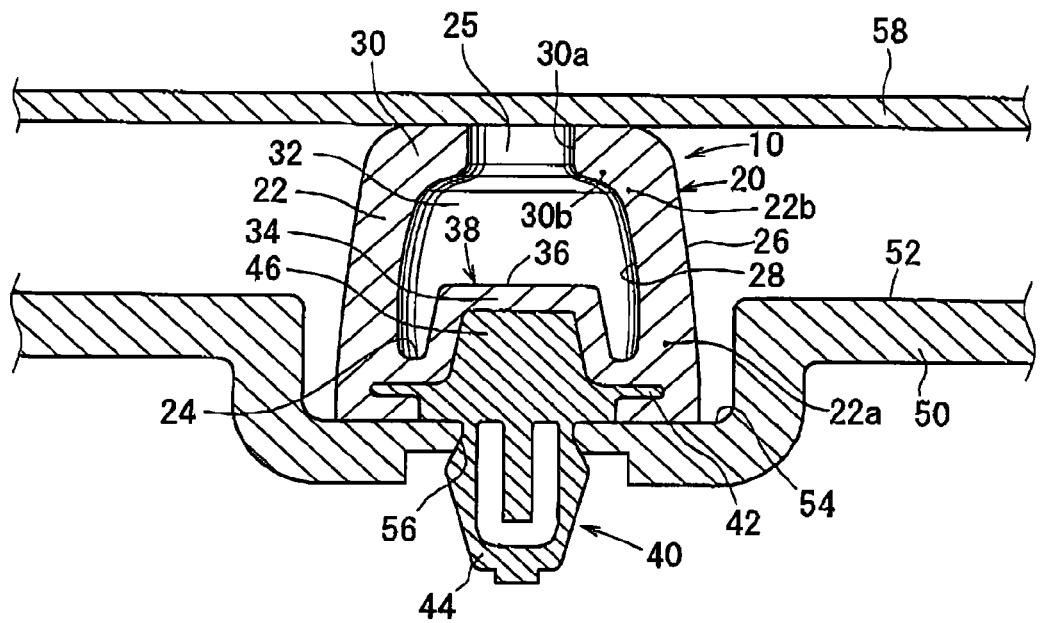
FIG. 6 is a view of the cushion clip, which illustrates a condition that the cushion clip is compressed to a line D-D in FIG. 5.

As shown in FIG. 6, when the amount of the compression becomes slightly greater than the amount corresponding to the line D-D shown in FIG. 5 after the initial compression period of the cushioning portion 20, the side wall portion 22 of the cushioning portion 20 may be deformed to have a cylindrical shape as the door 58 moves toward the cushioning portion 20. In this condition, the reaction force generated by the compressed cushioning portion 20 can be gently increased. The reason is as follows.

As previously described, in the cushion clip 10, the outer and inner surfaces 26 and 28 are tapered upwardly such that the thickness of the side wall portion 22 of the cushioning portion 20 is reduced upwardly. Further, the lower end 30b of the top portion 30 has a thickness greater than the thickness of the distal end 22b of the side wall portion 22. That is, the cushioning portion 20 is constructed such that the upper portion of the side wall portion 22 can be deformed most easily. Therefore, in the initial stage of the middle compression period of the cushioning portion 20, the distal end 22b of the side wall portion 22, that is continuous with the lower end 30b of the top portion 30, is arcuately flexed in vertical cross section while the top portion 30 of the side wall portion 22 being depressed inwardly downwardly. In contrast, a remaining portion or a substantial portion of the side wall portion 22 can simply be deformed outwardly without being deformed in the compression direction. Thus, the substantial portion of the side wall portion 22 can be deformed cylindrically as shown in FIG. 6 so as to extend in parallel with the compression direction.

In the intermediate stage of the middle compression period of the cushioning portion 20, the cylindrically shaped side wall portion 22 of the cushioning portion 20 can be flexed at a flexure portion while it is arcuately deformed outwardly. Then, the inner surface 28 of the top portion 30 of the side wall portion 22 is deformed downwardly so as to cover the upper end portion 36 of the cylindrical projection 38 projected from the bottom wall portion 24 of the cushioning portion 20. As will be recognized, the side wall portion 22 has the thickness that is reduced from the proximal end 22a thereof toward the distal end 22b thereof, and therefore, as the load applied to the door 58 is changed, the side wall portion 22 can be smoothly and constantly flexed due to flexural performance thereof while the flexure portion is gradually moved downwards. Therefore, even when the load applied to the door 58 is changed (increased), the reaction force generated by the deformed side wall portion 22 can be gently changed (increased) with increase of the amount of compression of the cushioning portion 20. Thus, in this stage, a desired reaction force can be generated. Further, the side wall portion 22 can be smoothly and constantly flexed until the top portion 30 of the side wall portion 22 contacts the projection 38 projected to the cavity portion 32 of the cushioning portion 20 after the door 58 is locked.

Figure 7:
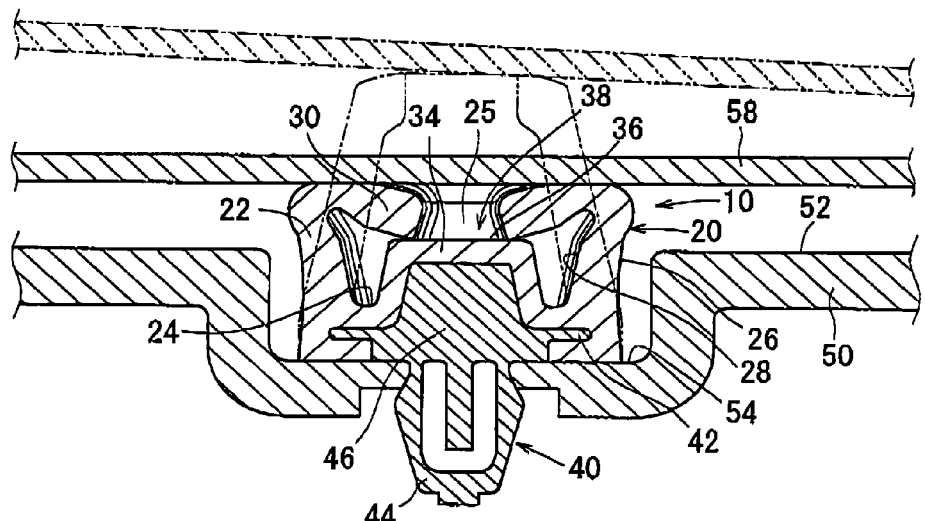
FIG. 7 is a view of the cushion clip, which illustrates a condition that the cushion clip is compressed to a line E-E in FIG. 5.

FIG. 7 shows a deformation condition of the cushioning portion 20 when the side wall portion 22 of the cushioning portion 20 contacts the projection 38. It shows the deformation of the cushioning portion 20 when the door 58 has moved toward the box main body 50 to the line E-E of FIG. 5. Because the upper end portion 36 of the projection 38 is positioned higher than the surface 52 of the box main body 50, the side wall portion 22 contacts the projection 38 before the door 58 interferes with the box main body 50.

When the door 58 is further compressed toward the box main body 50 from the condition illustrated in FIG. 7, the side wall portion 22 held between the projection 38 and the door 58, and the projection 38 with which the side wall portion 22 contacts are compressed. Thus, the reacting force is quickly increased. Because the outer protrusion 34 covers the inner protrusion 46 formed of polypropylene that is a hard resin material, it has a characteristic of being hardly bent by the load and capable of generating a large reaction force. Further, as shown in FIG. 7, as the side wall portion 22 is deformed, the reaction force may become larger.

Therefore, in the condition that the door 58 is closed between the line D-D and the line E-E in FIG. 5, even when the door 58 is pushed by a hand or an elbow of a passenger and a large reacting force is applied to the cushioning portion 20, the reacting force is quickly increased when the door 58 moves beyond the line E-E after the door 58 has moved to the line E-E. Therefore, the door 58 can move toward the box main body 50 only slightly beyond the line E-E, so that the door 58 is prevented from contacting the box main body 50.

According to the cushion clip 10 of the example 1, the cushion clip 10 used by being attached to the recessed portion 54 of the stationary member can provide a desired reaction force without need of enlarging the size of the cushion clip 10 and without being substantially bent. After reaching a certain amount of the stroke, the reaction force is increased quickly to prevent the movement portion from contacting the stationary portion.

Figure 8:
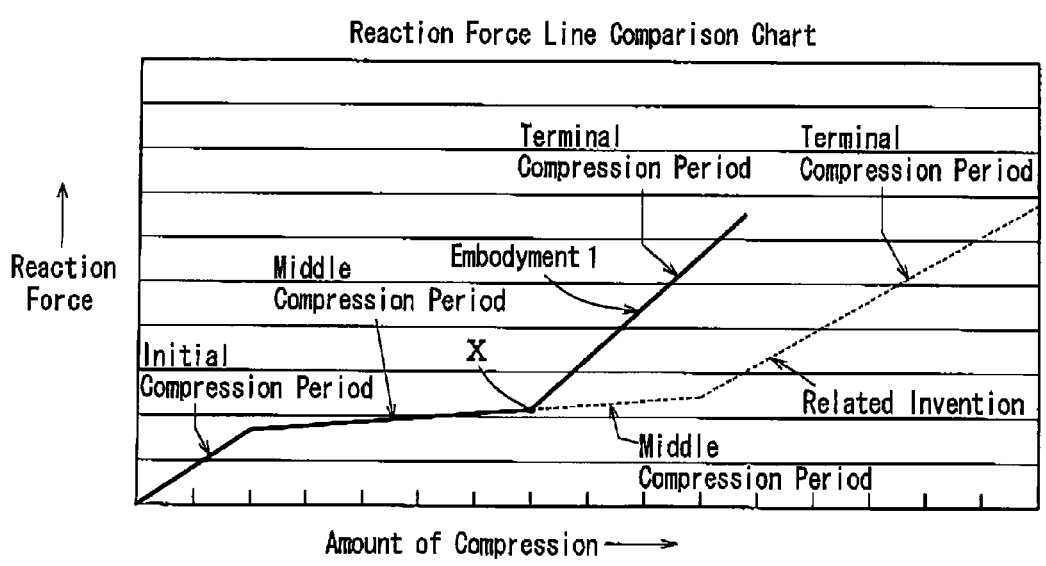
FIG. 8 is a graph illustrating a reaction force line comparison chart of the cushion clip of the representative example and the related invention.

FIG. 8 shows a graph illustrating a reaction force line comparison chart, in which the reaction force line of the cushion clip 210 of the related invention of the prior application and the reaction force line of the cushion clip 10 of the example 1 are schematically shown for comparison with each other. The cushion clip of the example 1 and the cushion clip 210 of the related invention used for comparison had the side wall portions 22 and 222, respectively, which are substantially identical in configuration. Thus, the reacting force line from the initial compression period to the middle compression period of the example 1 was substantially the same as that of the related invention. When the cushion clip 10 has been compressed to reach a point X in FIG. 8, the side wall portion 22 contacts the projection 38 positioned inside of the cushioning portion 20, thereafter, the reacting force increases quickly to reach a terminal compression period. On the other hand, the cushion clip 210 does not have a projection inside the side wall portion 222. Thus, after the cushion clip 210 has been compressed to reach the point X, the compression is continued in the middle compression period because it still remains a certain stroke until the cushion clip 210 reaches its stroke end.

Therefore, the cushion clip 10 of the example 1 allows control of the amount of stroke within the amount of the compression in the middle compression period of the cushion clip 210 by changing the height of the projection 38.

Further, the cushioning portion 20 is formed of elastomer. Therefore, the cushioning portion 20 is soft and is suited to elastically deform for absorbing shock. On the other hand, the engagement portion 40 is formed of polypropylene. Therefore, the engagement portion 40 may have high rigidity so as to be stably attached to the attachment hole 52. In addition, the cushioning portion 20 and the engagement portion 40 are integrally formed by a two-color molding technique. Therefore, the cushioning portion 20 and the engagement portion 40 can be securely connected to each other and can be easily handled.

According to the example 1, the outer protrusion 34 formed of elastomer covers the inner protrusion 46 formed of polypropylene to constitute a projection 38 jointly therewith. Thus, even when the hand or elbow of a passenger contacts the door 58 to apply a large load to the cushioning portion 20, the side wall portion 22 cannot contact the inner protrusion 46 directly. Further, the side wall portion 22 may not be damaged even in the case that the side wall portion 22 contacts the outer protrusion 34 formed of elastomer. Thus, the side wall portion 22 is capable of maintaining its intensity because no vulnerable part is given to the side wall portion 22. In addition, the side wall portion 22 formed of soft elastomer contacts the outer protrusion 34 formed of soft elastomer, and thus, a sound that may be produced by the interference between them is low and is not uncomfortable.

Naturally, various changes and modifications may be made to the above example 1. For example, in the above example 1, the upper end portion 36 of the projection 38 is positioned higher than the surface 52 of the box main body 50, but may be positioned at a different level. As shown in FIG. 7, the cushion clip 10 is constructed to prevent the door 58 from being interfered with the box main body 50 by the side wall portion 22 directly bearing against the door 58 and by the upper end portion 36 of the projection 38 contacting the upper end of the top portion 30 of the side wall portion 22. Therefore, by appropriately setting the thickness of the top portion 30, it is possible to prevent the interference between the door 58 and the box main body 50 even in the case that the height of the projection 38 is the same or lower than the height of the surface 52 of the box main body 50.

In the above example, the side wall portion 22 of the cushioning portion 20 is shaped so as to have the thickness that is reduced from the proximal end 22a thereof toward the distal end 22b thereof. However, the side wall portion 22 of the cushioning portion 20 may have a uniform thickness over the entire length thereof provided that the outer and inner surfaces 26 and 28 of the side wall portion 22 are respectively tapered upwardly. Thus, because the horizontal sectional area of the side wall portion 22 is reduced upwardly, the higher part of the side wall portion 22 tends to be easily flexed than the lower part. In the middle compression period, as the load applied to the door 58 is changed, the side wall portion 22 can be smoothly and constantly flexed due to flexural performance thereof while the flexure portion is gradually moved downwards. Therefore, it is not necessary to increase the size of the cushion clip 10, and the cushion clip 10 may have a long stroke and may be deformed to produce a necessary repulsing force without being substantially bent. After reaching the predetermined amount of the stroke, the top portion 30 of the upper end of the side wall portion 22 contacts the projection 38 inside the cushioning portion 20. Then, the reacting force is quickly increased so as to prevent the movable member from contacting the stationary member.

Further, the cushioning portion 20 can be formed of elastomer, for example, rubber, soft resin or other such materials. On the other hand, the engagement portion 40 can be formed of any hard resin, for example, polyacetal resin other than polypropylene. In addition, the cushioning portion 20 and the engagement portion 40 may be molded separately from each other and may be thereafter integrated by a two-color molding process, a multi-color molding process or an insert molding process. Further, the materials that are integrated by the multi-color molding process such as the two-color molding process may have any colors.

Moreover, in the example 1, the inner protrusion 46 which is integrally formed with the engagement portion 40 formed of hard resin material or polypropylene is covered with the outer protrusion 34 which is integrally formed with the cushioning portion 20 formed of soft material of elastomer, so that a projection 38 is constituted by the protrusions 46 and 34. However, the projection 38 may have any other construction and may be formed of any other material than those explained in the example 1. In addition, the soft and the hard resin material are defined such that the soft material is softer compared to the hard resin material.

Figure 9:
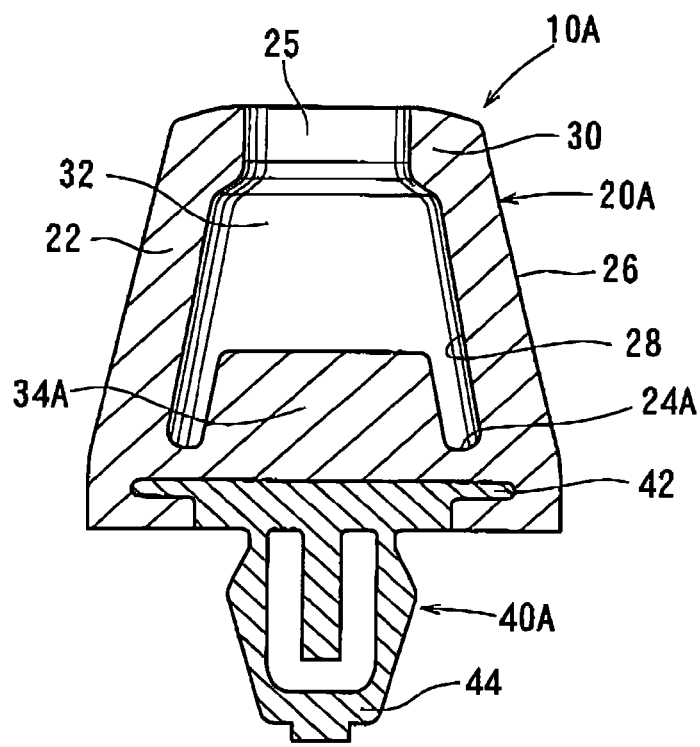
FIG. 9 is a vertical sectional view of the cushion clip of the alternative example.

FIG. 9 shows a vertical sectional view of a cushion clip 10A according to a modification of example 1. The cushion clip 10A has a projection 34A configured to be projected from a center portion of a bottom wall portion 24A and integrally formed with a cushioning portion 20A formed of elastomer. Further, by a two-color molding process, the cushioning portion 20A is integrally formed with an engagement portion 40A having no projection and formed of polypropylene. Because the projection 34A of the cushion clip 10A is formed of soft material or elastomer, the projection 34A may not be damaged even in the case that the top portion 30 of the upper end of the side wall portion 22 contacts the projection 34A, and a sound that may be produced by the interference between them is low and is not uncomfortable.

Figure 10:
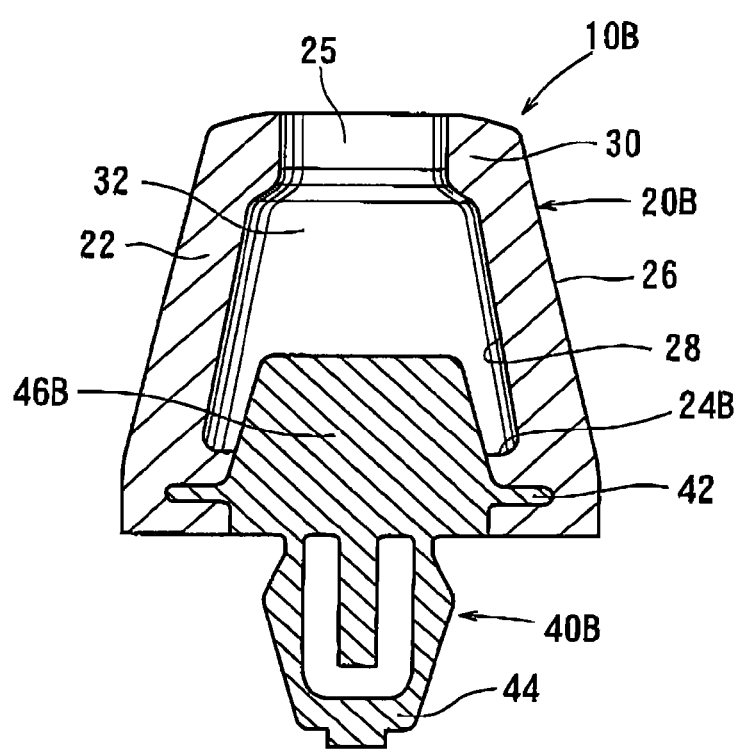
FIG. 10 is a vertical sectional view of the cushion clip of another example.

FIG. 10 shows a vertical sectional view of a cushion clip 10B according to another modification of the example 1. The cushion clip 10B has a cushioning portion 20B constructed to have a hole in the center of a bottom wall portion 24B formed of elastomer. A projection 46B integrally formed with an engagement portion 40B projects from the bottom wall portion 24B of the cushioning portion 20B. Because the projection 46B projected from the hole of the bottom wall portion 24B of the cushioning portion 20B is formed of polypropylene that is a hard resin material, it is capable of increasing the reacting force quickly after the top portion 30 of the upper end of the side wall portion 22 has contacted the projection 46B.

Figure 11:
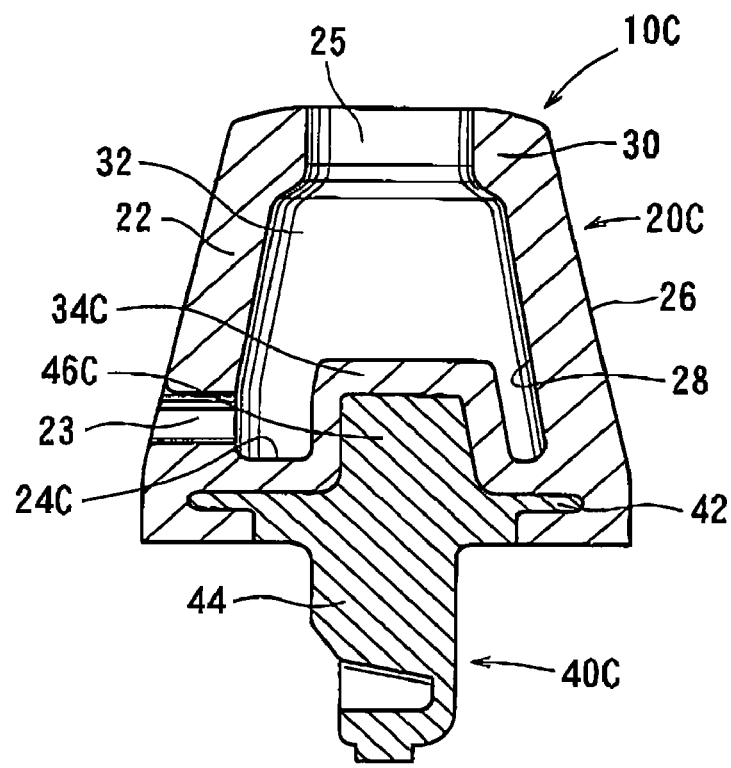
FIG. 11 is a vertical sectional view of the cushion clip, which form of the projection is changed.
Figure 12:
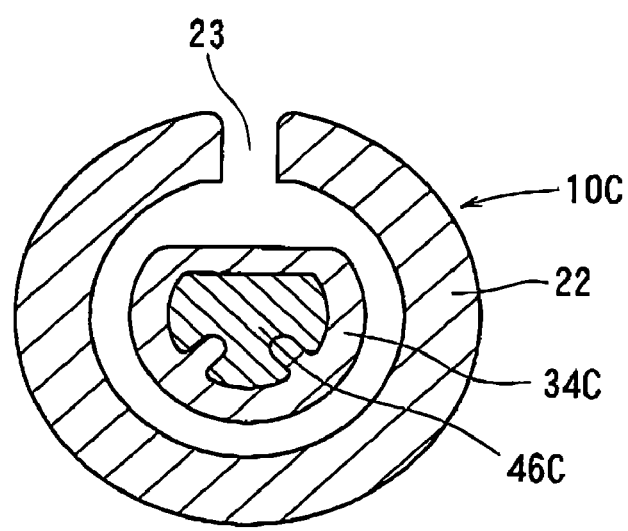
FIG. 12 is a horizontal sectional view of the cushion clip, which form of the projection is changed.

Although in the example 1 and its modifications, the projection has a configuration of cone-shaped frustum, the projection may have any other construction than those explained in the example 1. FIGS. 11 and 12 show a vertical sectional view and a horizontal sectional view of a cushion clip 10C according to a further modification in which projection has a configuration of a cone-shaped frustum with one or more cut-out portions. As shown in FIG. 11, an outer protrusion 34C integrally formed with a cushioning portion 20C covers an inner protrusion 46C integrally formed with an engagement portion 40C.

A part of a cone-shaped frustum of each of the outer protrusion 34C and the inner protrusion 46C is cut away on the side of the vent hole 23. The reason of incorporation of this design is as follows. Because a molding die for forming the vent hole 23 and a molding die for forming the cavity portion 23 may be bumped each other during the molding process of the cushion clip 10C, a portion of the molding die for forming the cavity portion 32, which is opposed to the vent hole 23, has an increased thickness in order to increase the strength of the molding die for forming the cavity portion 32. Further, as shown in FIG. 12, the inner protrusion 46C includes a vertical recessed portion. If the thickness of the inner protrusion 46C is thick, the shrinkage is easy to be generated after the molding process. For this reason, the thickness of the inner protrusion 46C is reduced to minimize the generation of the shrinkage.

Moreover, including the projection, the cushioning portion and the engagement portion can be integrally formed of rubber or elastomer by a single-color molding process. The single-color molding process can simplify the manufacturing process and allows reduction of cost such as a cost of the mold.

Further, the projection, the cushioning portion and the engagement portion can be formed separately, a hole can be formed in the bottom wall portion of the cushioning portion, and the projection can be attached on the upper surface of the engagement portion. Then, the engagement portion can be assembled with the cushioning portion so that the projection is projected from the bottom wall portion of the cushioning portion. According to this construction, the stroke of the cushion clip can be easy changed, because the stroke of the cushion clip is determined by the height of the projection attached to the engagement portion.

A representative example of the present invention has been described in detail with reference to the attached drawings. This detailed description is merely intended to teach a person of skill in the art further details for practicing preferred aspects of the present invention and is not intended to limit the scope of the invention. Only the claims define the scope of the claimed invention. Therefore, combinations of features and steps disclosed in the foregoing detail description may not be necessary to practice the invention in the broadest sense, and are instead taught merely to particularly describe detailed representative examples of the invention. Moreover, the various features taught in this specification may be combined in ways that are not specifically enumerated in order to obtain additional useful examples of the present invention.

What is claimed is:

1. A cushion clip capable of being attached to an attachment hole formed in a stationary member so as to be positioned between the stationary member and a movable member for absorbing an impact that may be applied when the movable member moves toward the stationary member, the cushion clip comprising:

a hollow cushioning portion capable of absorbing the impact and having a substantially circular central opening, an engagement portion capable of engaging with the attachment hole, and a projection, wherein the cushioning portion includes a bottom wall portion and a side wall portion, wherein the side wall portion has cone-shaped outer and inner surfaces each linearly tapered in a direction from a proximal end toward a distal end of the side wall portion, wherein the side wall portion further includes a top portion disposed at the distal end thereof, wherein the top portion has an inner periphery radially inwardly protruding from the side wall portion and defining a central opening therein, wherein the projection projects from the bottom wall portion toward the central opening of the cushioning portion and has an upper end portion having a diameter larger than or equal to a diameter of the central opening, and wherein as the movable member moves toward the stationary member, the top portion of the side wall portion is pushed by the movable member and covers the upper end portion of the projection.

2. The cushion clip as defined in claim 1, wherein the attachment hole is provided in a recessed portion of the stationary member, and the top portion of the side wall portion and the projection are constructed to prevent the movable member from interfering with the stationary member.

3. The cushion clip as defined in claim 1, wherein the side wall portion has a thickness that is reduced in a direction from the proximal end toward the distal end thereof.

4. The cushion clip as defined in claim 1, wherein the cushioning portion is formed of soft material and the engagement portion is formed of hard resin material.

5. The cushion clip as defined in claim 1, wherein the projection is formed of soft material and is integrally molded with the cushioning portion.

6. The cushion clip as defined in claim 1, wherein the projection is formed of hard resin material and is integrally molded with the cushioning portion.

7. The cushion clip as defined in claim 1, wherein the projection is constructed such that an inner protrusion is formed of hard resin material and is integrally molded with the engagement portion, and an outer protrusion is formed of soft material and integrally molded with the cushioning portion, and the inner protrusion is covered with the outer protrusion.

8. A cushion clip for mounting to a stationary member in order to absorb an impact applied to the stationary member by a movable member, comprising:

a hollow cushioning portion, a mounting portion capable of mounting to the stationary member, and a projection wherein the cushioning portion, the mounting portion and the projection are integrated with each other, wherein the cushioning portion includes a bottom wall portion and a side wall portion, wherein the side wall portion includes a top portion, wherein the projection projects from the bottom wall portion and has an upper end portion, and wherein the top portion of the side wall portion can contact the upper end portion of the projection to define an effective stroke of the cushion clip, and wherein the top portion has an inner periphery radially inwardly protruding from the side wall portion and defining a central opening therein and the upper end portion of the projection has a diameter larger than or equal to a diameter of the central opening.

9. A cushion clip for mounting to a stationary member in order to absorb an impact applied to the stationary member by a movable member, comprising:

a hollow cushioning portion, a mounting portion capable of mounting to the stationary member, and a projection wherein the cushioning portion, the mounting portion and the projection are integrated with each other, wherein the cushioning portion includes a bottom wall portion and a side wall portion, wherein the side wall portion includes a top portion, wherein the projection projects from the bottom wall portion and has an upper end portion, and wherein the top portion of the side wall portion can contact the upper end portion of the projection to define an effective stroke of the cushion clip, and wherein the side wall portion has cone-shaped outer and inner surfaces.

* * * * *